United States Patent
Moon et al.

(10) Patent No.: US 7,593,720 B2
(45) Date of Patent: Sep. 22, 2009

(54) METHOD AND AN APPARATUS FOR PROVIDING MULTIMEDIA SERVICES IN MOBILE TERMINAL

(75) Inventors: Seung-Hoon Moon, Seoul (KR);
Chang-Man Wang, Seoul (KR);
Yong-Bo Cho, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 226 days.

(21) Appl. No.: 10/524,679

(22) PCT Filed: Apr. 10, 2004

(86) PCT No.: PCT/KR2004/000832

§ 371 (c)(1),
(2), (4) Date: Sep. 30, 2005

(87) PCT Pub. No.: WO2004/091112

PCT Pub. Date: Oct. 21, 2004

(65) Prior Publication Data

US 2006/0140141 A1   Jun. 29, 2006

(30) Foreign Application Priority Data

Apr. 10, 2003   (KR) .................. 10-2003-0022658
May 21, 2003   (KR) .................. 10-2003-0032318

(51) Int. Cl.
*H04M 3/42* (2006.01)
*H04M 1/00* (2006.01)

(52) U.S. Cl. .................. 455/414.1; 455/550.1

(58) Field of Classification Search ............... 455/3.01, 455/3.06, 414.1, 418, 426.1, 550.1; 709/217, 709/225; 713/189

See application file for complete search history.

(56) References Cited

U.S. PATENT DOCUMENTS 5,243,123 A * 9/1993 Chaya .................... 434/307 A (Continued)

FOREIGN PATENT DOCUMENTS

KR   2001-0036830 A   5/2001

(Continued)

OTHER PUBLICATIONS

Lilian Lim."Changing Faces-The Ericsson A2618s(Part1/2)". http://www.imobile.com.au/PhoneReviews/default.asp?ID=reviewsmar0101. Available Mar. 2001. Access Aug. 24, 2007.*

(Continued)

*Primary Examiner*—Lester Kincaid
*Assistant Examiner*—Nathan Mitchell
(74) *Attorney, Agent, or Firm*—Lowe Hauptman Ham & Berner, LLP

(57) ABSTRACT

A method and an apparatus provide a service of multimedia data in a mobile terminal. In the method and the apparatus, a package data is generated and stored at a multimedia data providing device. The package data includes an execution condition and a multimedia file corresponding to the execution condition, wherein the multimedia file executes in the mobile terminal when the execution condition is satisfied. When the mobile terminal accesses the multimedia data providing device and requests the multimedia data, the package data including the multimedia data is transmitted to the mobile terminal through communication network. According to the method and the apparatus, the mobile terminal is simply provided various multimedia services.

27 Claims, 5 Drawing Sheets

U.S. PATENT DOCUMENTS

| | | | |
|---|---|---|---|
| 6,710,702 B1* | 3/2004 | Averbuch et al. | 340/7.1 |
| 6,772,209 B1* | 8/2004 | Chernock et al. | 709/225 |
| 6,779,115 B1* | 8/2004 | Naim | 713/192 |
| 6,922,735 B2* | 7/2005 | Chang | 710/5 |
| 7,016,970 B2* | 3/2006 | Harumoto et al. | 709/233 |
| 7,107,045 B1* | 9/2006 | Knoop | 455/414.1 |
| 7,149,541 B2* | 12/2006 | Rautila | 455/552.1 |
| 7,254,415 B2* | 8/2007 | Okamura | 455/556.1 |
| 2001/0053707 A1* | 12/2001 | Lutnaes | 455/566 |
| 2002/0035692 A1* | 3/2002 | Moriai | 713/189 |
| 2002/0062361 A1* | 5/2002 | Kivipuro et al. | 709/219 |
| 2002/0173294 A1* | 11/2002 | Nemeth et al. | 455/412 |
| 2003/0004983 A1* | 1/2003 | Cohen | 707/500 |
| 2003/0153265 A1* | 8/2003 | Hunt | 455/3.06 |
| 2003/0166405 A1* | 9/2003 | Jauk et al. | 455/466 |
| 2003/0224770 A1* | 12/2003 | Reinholdsson et al. | 455/418 |
| 2004/0203385 A1* | 10/2004 | Narayanan et al. | 455/41.2 |
| 2005/0064849 A1* | 3/2005 | Coppinger et al. | 455/414.1 |
| 2006/0014523 A1* | 1/2006 | Reilly | 455/412.1 |
| 2006/0136773 A1* | 6/2006 | Kespohl et al. | 714/2 |

FOREIGN PATENT DOCUMENTS

| | | |
|---|---|---|
| KR | 2001-0095607 A | 11/2001 |
| KR | 2003-0008522 A | 1/2003 |

OTHER PUBLICATIONS

International Search Report for PCT International Application No. PCT/KR2004/000832, mailed Jun. 29, 2004.

* cited by examiner

METHOD AND AN APPARATUS FOR PROVIDING MULTIMEDIA SERVICES IN MOBILE TERMINAL

This application is a U.S. National Phase of PCT International Application No. PCT/KR2004/000832, filed Apr. 10, 2004.

TECHNICAL FIELD

The present invention relates to a method and an apparatus for providing multimedia services. More specifically, the present invention relates to a method and an apparatus for providing multimedia services such as video and audio, etc. when a user uses a mobile terminal in a mobile communication system.

BACKGROUND ART

Lately, the functions of wireless Internet and multimedia services in the mobile terminal have been improved. Accordingly, the size of the display panel has become bigger so that the mobile terminal can display the higher quality of video. Moreover, mobile terminals which have a function of camera are released to the market.

As the display panel of the mobile terminal becoming bigger and its function is becoming improved, numerous plans for satisfying the users wanting to embody their unique individual characters by using the display panel of the mobile terminal.

As one plan of the above, the function of displaying still images or moving images, which are directly photographed by the user using a camera mounted on the mobile terminal, or still images or moving images, which are downloaded from a web server providing the service of downloading background screens, in the display panel of the mobile terminal as a background screen, is widely used.

Currently, as the kinds of background screen capable of displaying video in the mobile terminal, there are a starting screen when supplying power with the mobile terminal, a standby screen at normal times, a receiving screen when receiving a phone call, a sending screen when calling a phone call, a connecting screen when connecting to the internet and an ending screen when ending the mobile terminal.

The user of the mobile terminal stores the still images or moving images, which are directly photographed by using the camera mounted on the mobile terminal, or downloads the still images or moving images from a web server providing the service of downloading background screens, and then sets and stores one still image or moving image in the above background screens.

Then, the starting screen is displayed when turning on the mobile terminal, the ending screen is displayed when turning off the mobile terminal, and the standby screen at normal times. Also, when receiving a phone call, a receiving screen is displayed in the display panel of the mobile terminal. Further, when inputting a phone number and selecting a button for calling, a sending screen is displayed in the display panel of the mobile terminal, and when selecting a button for connecting the internet, an internet-connecting screen is displayed in the display panel of the mobile terminal.

However, conventionally, the user had to perform several repetitive operations to set the still image or moving image which corresponds to each event of showing the background screen in the mobile terminal. Therefore, it was inconvenient to perform the same setting operations for each number of background screen.

In addition, the user of the mobile terminal looks at the display panel of the mobile terminal when inputting the phone number to call the other party more than the background screen.

Nevertheless, the conventional panel of the mobile terminal was set to display only the phone number inputted by the number button of keypad in a phone number inputting screen, that is, the numbers while leaving the remaining space blank, or was set to display the number in the same screen.

In addition, the conventional mobile terminal provides still images or moving images, namely, video data, which were previously set, as the plurality of background screens. Moreover, if the user selects a button of keypad of the mobile terminal, a service of making audios previously set by the user is provided as the user had set.

At this time, it is impossible to download the service of providing the background screen and audio simultaneously allocated to the number. That is, it has caused inconveniences of downloading the video data and audio data separately and storing them in a predetermined memory of the mobile terminal.

Therefore, it is highly necessary to provide a service of storing the video data and audio data as one multimedia file so that the multimedia file can be transmitted to the mobile terminal. And it is also necessary to provide simultaneously video data, audio data and text data included in the transmitted multimedia file.

DISCLOSURE OF INVENTION

The present invention is conceived considering the above-mentioned circumstances. According to one aspect of the present invention, when a user uses a mobile terminal, an exemplary method of the present invention multimedia services to the mobile terminal which offers multimedia data allocated to each event to the user while the user pushes a key button and an apparatus for providing the same.

An additional aspect of the present invention is to provide a method for providing multimedia data which displays various background screens while the user selects number keys or special keys of the mobile terminal and an apparatus for providing the same.

In addition, yet another aspect of the present invention is to provide a method for providing multimedia data which transforms and transmits data including multimedia file transmitted to the mobile terminal as one package data and which executes at least two data among video data, audio data and text data, and an apparatus for providing the same.

The method for providing multimedia services according to the first point of view of the present invention comprises the steps of:

(a) generating and storing a package data including an execution condition to be executed in a mobile terminal and a predetermined multimedia file according to the execution condition; and (b) downloading the package data according to the condition, which is previously set, to the mobile terminal through the communication network and storing the package data in a memory part of a mobile terminal.

Preferably, the method further comprises the step of:

(c) executing the multimedia file according to the execution condition when the execution condition is satisfied in the mobile terminal which receives the package data.

More preferably, the method is characterized by that the execution condition is satisfied by a key signal, which is generated from a key pad of the mobile terminal, being inputted into the mobile terminal.

At this time, the key signal is one of the following signal:

a starting key signal for supplying power to the mobile terminal, a call receiving key signal for connecting a call when a call is requested to the mobile terminal, a call sending key signal used when a call is requested a call by using the mobile terminal, an ending key signal for ending the mobile terminal, and an internet connecting key signal used when a wireless communication network is connected by using the mobile terminal.

The method is characterized by that the execution condition is satisfied by the number key signal or the special key signal of the mobile terminal being inputted, and that the execution condition is satisfied by a conversion signal to a standby mode being inputted after the starting key signal is inputted.

More preferably, the step (a) of generating and storing the package data comprises the steps of:

a-1) setting at least one execution condition to be executed in the mobile terminal;

a-2) selecting a predetermined multimedia file according to the set execution condition;

a-3) generating and storing the execution condition and the multimedia file according to the execution condition as one file.

At this time, the package data can be stored as a compressed file depending on the purpose of the company providing the services in order to reduce the transmission capacity in the communication network, and can be provided as a simple merged file in order to generate the package data quickly in the package generating server.

Also, if the user receives a download requesting message of the multimedia file from the mobile terminal or if a certain time has passed for downloading the multimedia file to the mobile terminal, the package data is transmitted to the mobile terminal. The multimedia file includes video data and audio data.

The method for providing multimedia services in a mobile terminal according to the second point of view of the present invention for achieving the object comprises the steps of:

(i) setting at least one execution condition to be executed in the mobile terminal;

(ii) selecting a predetermined multimedia file according to the set execution condition;

(iii) generating and storing a package data including the execution condition and the multimedia file according to the execution condition;

(iv) downloading the package data according to the set condition to the mobile terminal and storing it in a memory part; and (v) executing the multimedia file according to the execution condition if the execution condition is satisfied in the mobile terminal which receives the package data.

Preferably, the multimedia data is characterized by including video data, audio data and text data, and the package data is characterized by being able to be stored as a compressed file in order to reduce the transmission capacity in the communication network or a simple merged data depending on the purpose of company providing the services.

More preferably, the execution condition is satisfied if one of the following signals are inputted:

the starting key signal for supplying power with the mobile terminal;

the call receiving key signal for connecting a call when a call is requested to the mobile terminal;

the call sending key signal when requesting a call by using the mobile terminal;

the ending key signal for ending the mobile terminal; and an internet connecting key signal when connecting the wireless communication network by using the mobile terminal is inputted.

The execution condition is satisfied by the number key signal or special key signal of the mobile terminal is selectively inputted in the mobile terminal.

The apparatus for providing multimedia services in a mobile terminal according to the third point of view of the present invention comprises:

a package data generating part for generating a package data including an execution condition to execute a multimedia file and a predetermined multimedia file according to the execution condition; and A package data managing part for storing the package data generated from the package data generating part and for transmitting the package data to the mobile terminal according to a predetermined condition.

Preferably, the package data generating part comprises:

a database managing module for storing the multimedia file transmitted from a server of a multimedia file provider by each predetermined classified item; and a package data generating module for combining at least one multimedia file with one execution condition and combining each multimedia file stored correspondingly to a plurality of execution conditions to generate a package data.

Also, the package data managing part comprises:

a user information managing module for managing information of a plurality of the mobile terminals provided with the multimedia services;

a storing module for storing the package data generated from the package data generating part; and a transmitting module for transmitting the package data to the mobile terminal if the mobile terminal requests the package data to be downloaded or if the latest downloading information passes a certain time when searching the downloading information.

By the above, the present invention can embody various multimedia services in the mobile terminal.

DETAILED DESCRIPTION

Figure 1:
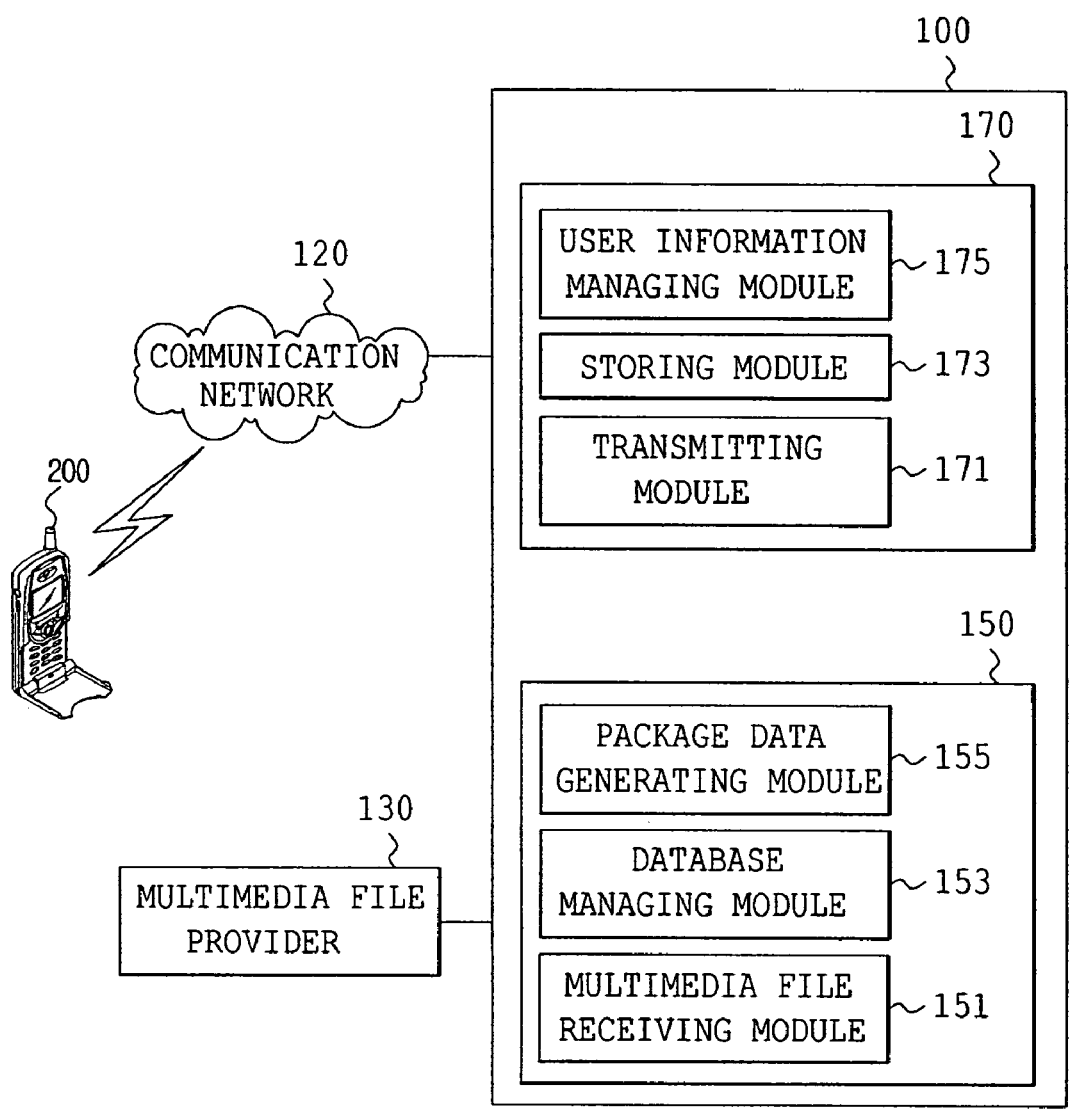
FIG. 1 is a view for showing a system for providing multimedia services comprising an apparatus for providing multimedia services in a mobile terminal according to one embodiment of the present invention.

Hereinafter, preferable embodiments of the present invention are explained in detail by referring to the drawings attached hereto.

FIG. 1 is a view for showing a system for providing multimedia services comprising an apparatus for providing multimedia services in a mobile terminal according to one embodiment of the present invention.

As shown in FIG. 1, the system for providing multimedia services comprises a mobile terminal (200), a communication network (120) including a mobile communication system, a server of a multimedia file provider (130) and an apparatus for providing multimedia contents (100).

The mobile communication system comprises a base station, a switching system, home location register and SMS (Short Message Service) center, which are not illustrated herein. The base station comprises a base transceiver station (BTS) and a base station controller (BSC).

The mobile terminal (200) communicates with the apparatus for providing multimedia contents (100) by using a broadband protocol such as a cellular phone through the communication network (120).

The apparatus for providing multimedia contents (100) comprises a package data generating part (150) and a package data managing part (170). In one application, the package data generating part (150) and the package data managing part (170) are connected through a wireless and wireline communication network. However, in another application, they are connected by a private line. Preferably, they are arranged in one apparatus (see FIG. 1).

The package data generating part (150) generates a package data to be received by the mobile terminal (200). The package data includes a multimedia file and an execution condition to execute the multimedia file in the mobile terminal (200). The package data generating part (150) having the above function includes a multimedia file receiving module (151), a database managing module (153) and a package data generating module (155).

The multimedia file receiving module (151) receives the multimedia files provided periodically or a periodically from the server of the multimedia file provider (130) and stores them.

The database managing module (153) stores the multimedia files provided from the server of the multimedia file provider (130) by each predetermined classified item.

The package data generating module (155) combines one execution condition with at least one multimedia file. One package data is generated by combining a plurality execution conditions combined by the above method with each of the multimedia files respectively combined with the plurality of execution conditions together.

The package data generating part (150) can be operated by a company providing mobile communication service or can be operated by a multimedia file provider.

The package data managing part (170) stores the package data generated from the package data generating part (150) and transmits the package data to the mobile terminal (200) according to a predetermined condition. The package data managing part (170) comprises a transmitting module (171), a storing module (173) and a user information managing nodule (175).

The user information managing module (175) manages the information of subscribers which applied for the provision of the multimedia services, and comprises hardwares such as CPU, etc. which processes the multimedia data requested by the user.

The storing module (173) comprises a hard disc drive, etc. which stores the transmitted package data from the package data generating part (150).

The transmitting module (171) transmits the package data to the mobile terminal (200) through the communication network (120). At this time, the transmitting module (171) transmits the package data to the mobile terminal (200) if a message requesting the package data to be downloaded is received from the mobile terminal (200).

Figure 2:
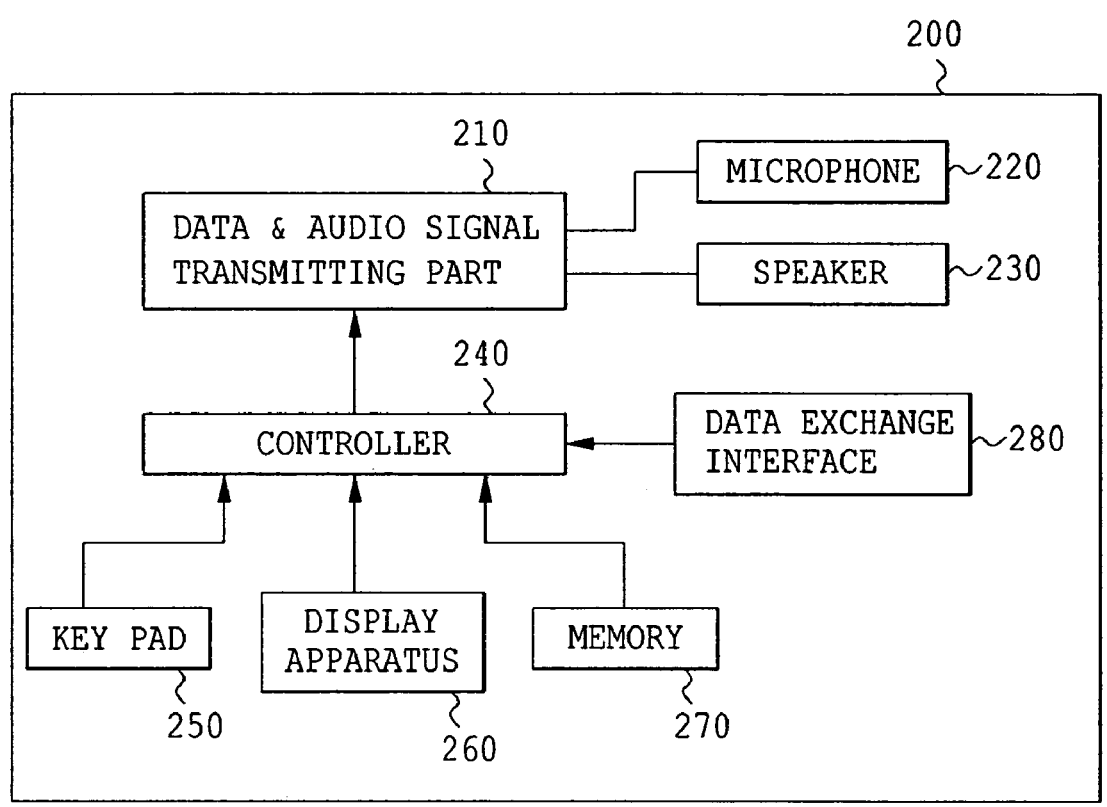
FIG. 2 is a schematical view of an interior diagram of the mobile terminal applied by one embodiment of the present invention.

FIG. 2 is a view for showing a schematical interior block diagram of the mobile terminal applied in one embodiment of the present invention.

As defined herein, the mobile terminal (200) may not only be a cellular phone, but may also be a PDA or a notebook computer. The present invention describes a mobile terminal as one embodiment, but this invention can be applied to a wireline as well as a wireless terminal which can connect to the wireline or wireless internet through the communication network (120).

The mobile terminal (200) comprises data and audio signal transmitting part (210), a microphone (220), a speaker (230), a controlling part (240), a keypad (250), a display apparatus (260) and a memory (270).

The controlling part (240) controls and manages the interior apparatuses of the mobile terminal based on softwares such as an operation program, data required for the operation and an application program, etc.

The memory (270) stores the downloaded package data, etc.

The key pad (250) is an input means for inputting numbers, letters and special functions to the controlling part (240) of the mobile terminal (200).

The display apparatus (260) displays not only the key signals inputted by the key pad (250) but also the multimedia file in the package data stored in the memory (270) such as still images and moving images.

The speaker (230) outputs received voice signals and audio data in the package date.

The mobile terminal having the above constitutions performs different video data, audio data and text data, namely, multimedia files according to the inputting of a key signal or a predetermined condition generated by selecting a button of the key pad (250).

The method for providing a multimedia data according to the above constitutions is explained more in detail as follows.

Figure 3:
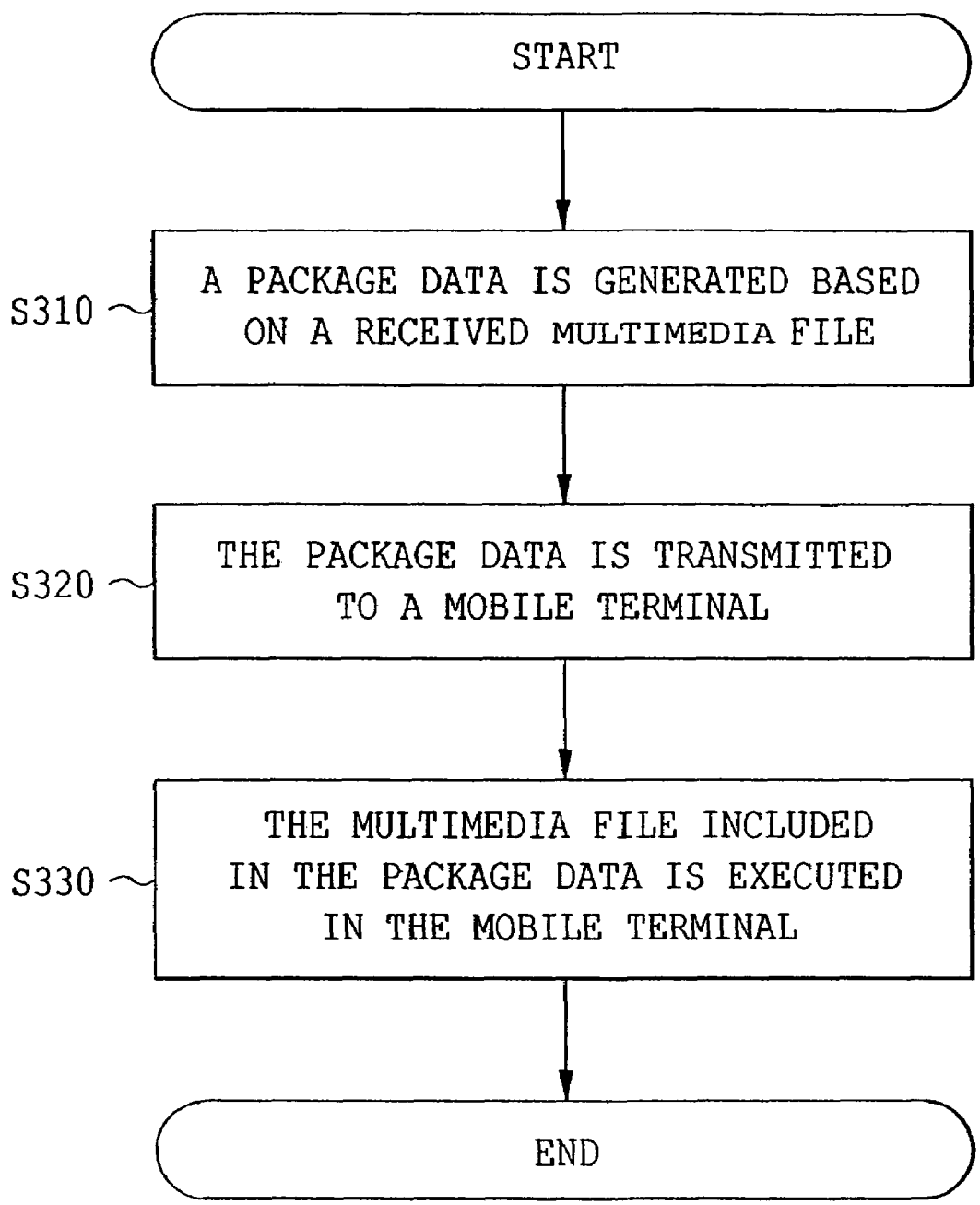
FIG. 3 is a flow chart for schematically explaining the method for providing the multimedia services according to one embodiment of the present invention.

FIG. 3 is a flowchart for schematically explaining the method for providing multimedia services according to the one embodiment of the present invention.

Upon reviewing the method for providing the multimedia services of the present invention schematically, first of all, a package data is generated from at least one data among video data, audio data and text data provided from a multimedia file provider server (130) (S310).

Otherwise, companies providing multimedia data can generate video data, audio data and text data as a package data and then can upload it to an apparatus for providing multimedia contents (100) by using PC, etc.

If the generated package data satisfies a certain condition, the package data is transmitted to the mobile terminal (200) (S320).

The transmitted package data is stored in the memory (270) of the mobile terminal (200), and if certain conditions, such as inputting of the key signal of the mobile terminal (200), are satisfied, the multimedia file included in the package data is executed and the video data and text data are provided to a displaying part (260), and the audio data is provided to a speaker (230) (S330).

Figure 4:
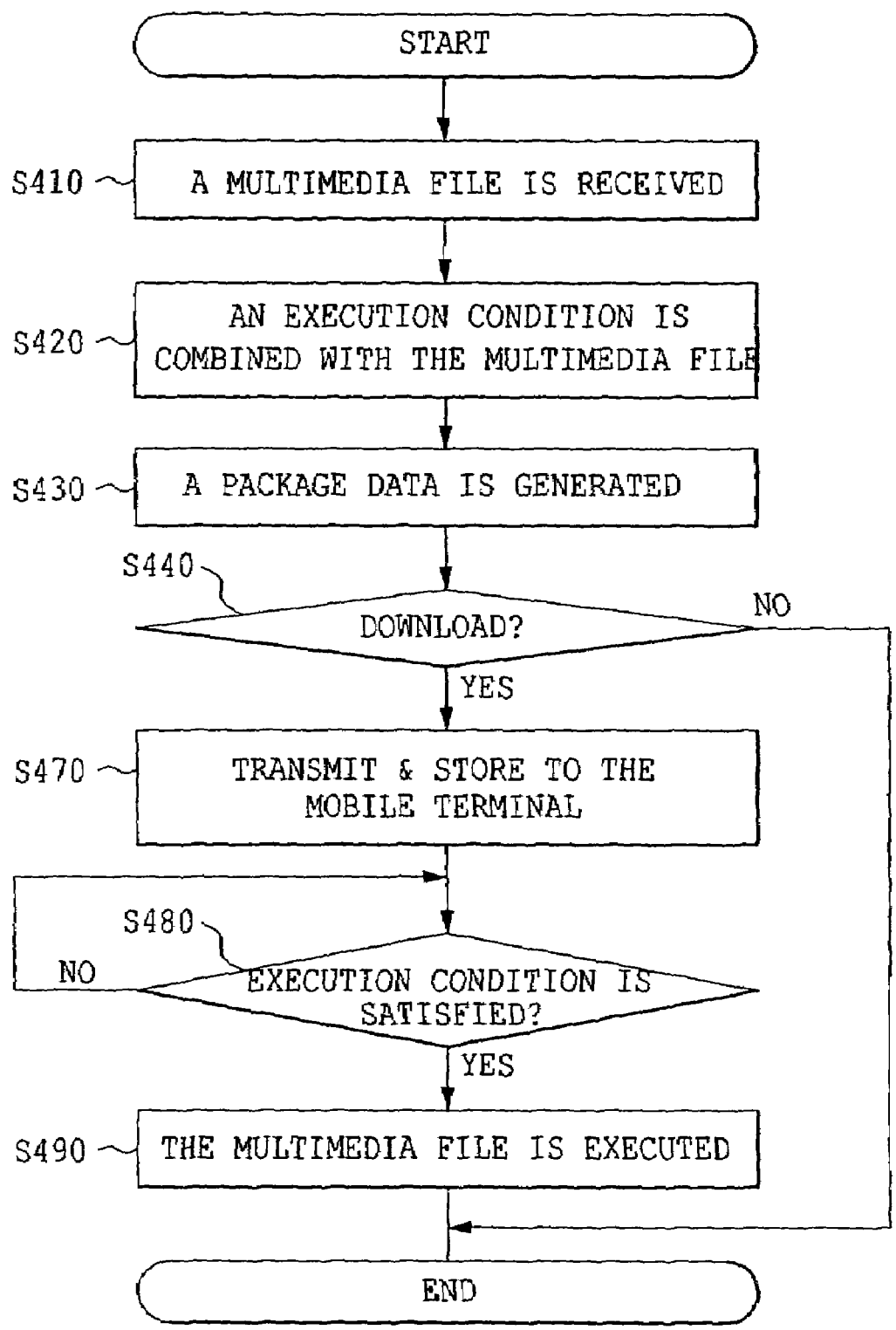
FIG. 4 is a flow chart for explaining the method for providing the multimedia services according to one embodiment of the present invention in detail.

FIG. 4 is a flow chart for explaining the method for providing multimedia services according to the one embodiment of the present invention.

A contents providing apparatus (100) receives a multimedia file from the multimedia file provider server (130) (S410).

The received multimedia file is stored in a file receiving module (151) of the package data generating part (150). The multimedia file is stored in the database by item and is managed in the database managing module (153) The execution condition to be executed in the mobile terminal is combined with at least more than one multimedia file, which is executed if the execution condition is satisfied (S420).

The execution condition is at least one, and if the execution conditions are numerous, the plurality of the execution conditions and the multimedia files corresponding to each of the plurality of the execution conditions are gathered and are generated as one package data (S430)

As one example, the execution conditions to be executed by the multimedia file in the mobile terminal (200) are set by inputting of the key signals generated from the key pad of the mobile terminal (200) and by the standby status of the mobile terminal (200), etc.

The key signals include a starting key signal for supplying power with the mobile terminal (200), a call receiving key signal for connecting a call when a call is requested to the mobile terminal (200), a call sending key signal for requesting a call by using the mobile terminal (200), an ending key signal for ending the mobile terminal (200) and an internet connecting key signal for connecting the wireless communication network by using the mobile terminal (200).

The key signals comprise number keys (0-9) and special keys (*, #), etc.

In addition, a package data generator selects at least one execution condition of the above execution conditions, and selects the multimedia file according to the selected execution condition.

For example, at the step (S420), a multimedia file including moving images or still images of 'The 12 Oriental Zodiac Animals' is designated to the number keys and special keys (* and #). More specifically, a multimedia file including audio data "zero" and a moving image of a mouse character are designated to the number key "0", and a multimedia file including audio data "star" and a moving image of a dog character are designated to the special key "*."

If the mobile terminal (200) connects to the multimedia contents providing apparatus (100) through the communication network, (120) and requests the downloading of the multimedia data, the multimedia contents providing data (100) transmits the package data stored in the storing module (173) to the mobile terminal (200) (S440 and S470).

The package data transmitted to the mobile terminal is stored in the memory (270) of the mobile terminal (200).

If the execution condition is satisfied in the mobile terminal (200), the package data stored in the memory (270) is loaded and the multimedia file according to the execution condition included in the package date is executed (S480 and S490).

For example, if the user selects a number key "0" in the above examples, that is, the execution condition of inputting a key signal is satisfied, the mouse character, which is set in the number key "0", appears on the displaying part (260) as a moving image or still image and outputs the audio data "0" through the speaker (230).

Figure 5:
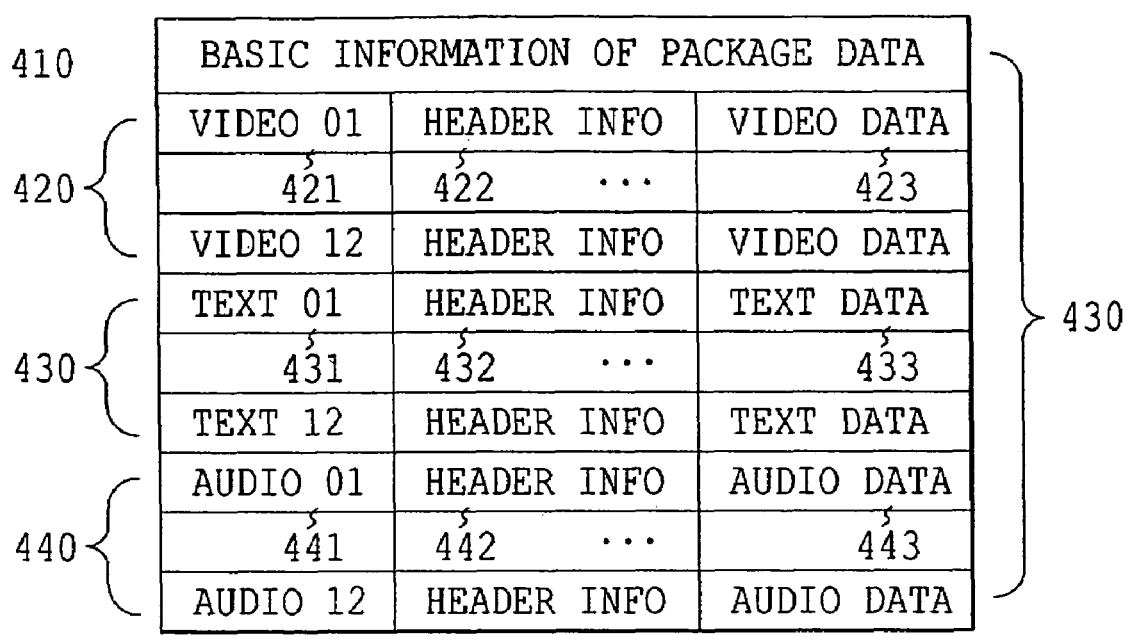
FIG. 5 is a view for showing a format according to one embodiment of the present invention.

FIG. 5 is a format of a package data according to one example of the present invention.

One package data (400) comprises of a header part (410) including information of the package data, video data (420) and audio data (440) and text data (430).

The header part (410) can define the individual execution condition to be allocated to the data in the package data. A Service provider can determine the execution condition to be allocated by the present method for providing multimedia services and the apparatus for providing the same. The execution conditions are set as various circumstances such as pushing the number keys of 0-9, the special keys including "*" (a star key) and "#" (a sharp key), the power on/off keys, the call sending key, the call receiving key, the wireless internet connecting key and standby status, etc.

The video data (420) region comprises information (421) of a relevant data allocated to a certain execution condition, information of the kind of the relevant data such as still image format (e.g. JPG, GIF and BMP, etc.) or animation format (e.g. Animation GIF and SIS) or moving image format (e.g. MPEG4, AVI) (422) and the substantial video data region (423).

At this time, a video data set can be defined according to the execution conditions to be allocated and the allocating method. For example, in case of selecting number keys for the same video data, one video data is sufficient to provide the service of the present invention. In case of providing different multimedia files with the respective number keys and special keys, at least 12 data are required, as shown in FIG. 4.

The text data (430) region comprises information (431) of the relevant data allocated to a certain execution condition and action information (432) such as font, size and left and right scrolls of the text and the text-self data (433).

As a result, when the video data or text data is outputted to the displaying part (260), the displaying position of the data, such as upper portion and central portion, etc., can be set. In addition, the effect of left and right scroll, and up and down scroll can be set. For the text data, various effects such as font, size, color and thickness of letters can be provided.

The audio data (440) region comprises information (441) of the relevant data allocated to a certain execution condition, information of the kind of the audio format of the relevant data (e.g., wav and mp3) (442) and a substantial audio data (443) region.

Moreover, since the audio data can provide various effects such as control of sound volume, the present invention can have an effect of providing a distinctive service.

Thus, once the downloaded package data is stored in a mobile terminal, it can execute multimedia files through a display part and speaker of the mobile terminal without a particular execution condition set in the background screen, number keys and special keys of the mobile terminal, if a predetermined execution condition is satisfied. This is a distinctive service from the conventional service which provides simple pictures or effect sounds.

In addition, at the time of producing a package data, the multimedia service provider can gather a plurality of multimedia files having similar characters as one package, and the user of the mobile terminal can access the multimedia services having consistency by downloading the relevant package data and by using it.

The invention claimed is:

1. A method for providing multimedia services in a mobile terminal, comprising the steps of:
    (a) determining a plurality of execution conditions for execution in the mobile terminal;
    (b) generating and storing a data package for download to the mobile terminal, the data package including the determined execution conditions and predetermined multimedia files, each associated with one of the determined execution conditions, wherein storing a data package for download includes storing the multimedia files transmitted from a multimedia file provider server by predetermined classified item, and generating the package data includes combining one execution condition with at least one multimedia file and by combining each of the multimedia files stored corresponding to a plurality of execution conditions with the plurality of execution conditions;

(c) downloading the data package to the mobile terminal through a communication network.

2. The method as claimed in claim 1, further comprising the steps of:
 (e) loading, in the mobile terminal, the data package to set the plurality of execution conditions;
 (f) selecting at least one of the predetermined multimedia files of the data package for execution, the at least one of the predetermined multimedia files being selected using the associated set execution condition; and
 (g) executing the selected predetermined multimedia file or files in accordance with the associated set execution condition.

3. The method as claimed in claim 2, wherein step (g) includes executing the multimedia file or files according to the associated set execution condition when the execution condition in the mobile terminal receiving the data package is satisfied.

4. The method as claimed in claim 3, wherein the associated set execution condition is satisfied by a key signal generated from a key pad of the mobile terminal being inputted to the mobile terminal.

5. The method as claimed in claim 4, wherein the key signal is one of the following signals:
 a starting key signal for supplying power to the mobile terminal, a call receiving key signal for connecting a call when a call is requested to the mobile terminal, a call sending key signal used when a call is requested by using the mobile terminal, an ending key signal for ending the mobile terminal or an internet connecting key signal used when a wireless communication network is connected by using the mobile terminal.

6. The method as claimed in claim 4, wherein the associated set execution condition is satisfied by a number key signal of the mobile terminal being inputted to the mobile terminal.

7. The method as claimed in claim 4, wherein the associated set execution condition is satisfied by a special key signal of the mobile terminal being inputted to the mobile terminal.

8. The method as claimed in claim 2, wherein the associated set execution condition is satisfied by a key signal generated from a key pad of the mobile terminal being inputted to the mobile terminal.

9. The method as claimed in claim 8, wherein the key signal is one of the following signals:
 a starting key signal for supplying power to the mobile terminal, a call receiving key signal for connecting a call when a call is requested to the mobile terminal, a call sending key signal used when a call is requested by using the mobile terminal, an ending key signal for ending the mobile terminal or an Internet connecting key signal used when a wireless communication network is connected by using the mobile terminal.

10. The method as claimed in claim 8, wherein the associated set execution condition is satisfied by a number key signal of the mobile terminal being inputted to the mobile terminal.

11. The method as claimed in claim 10, wherein the associated set execution condition is satisfied by a special key signal of the mobile terminal being inputted to the mobile terminal.

12. The method as claimed in claim 2, wherein the step of selecting at least one of the predetermined multimedia files is responsive to the associated set execution condition being satisfied by user input.

13. The method as claimed in claim 1, wherein the step of (b) generating and storing the data package comprises the steps of:
 b-1) selecting each predetermined multimedia file stored in the data package according to the associated set execution condition; and
 b-2) generating and storing the selected multimedia file and the associated set execution condition, as one file.

14. The method as claimed in claim 13, wherein the data package is stored as a compressed file to reduce a transmission capacity.

15. The method as claimed In claim 13, wherein the data package is stored as a merged file to reduce a time to generate the data package in a package generating server.

16. The method as claimed in claim 1, wherein the data package is stored as a compressed file to reduce a transmission capacity.

17. The method as claimed in claim 1, wherein the data package is stored as a merged file to reduce a time to generate the data package in a package generating server.

18. The method as claimed in claim 1, wherein the associated set execution condition is a condition to receive a download requesting message from the mobile terminal.

19. The method as claimed in claim 1, wherein the at least one of the predetermined multimedia files comprises video data and audio data.

20. A method for providing multimedia services in a mobile terminal, comprising the steps of:
 determining execution conditions to be executed in the mobile terminal;
 generating and storing a data package including the execution conditions and corresponding multimedia files according to the execution conditions, wherein generating the package data includes combining one execution condition with at least one multimedia file and by combining each of the multimedia files stored corresponding to a plurality of execution conditions with the plurality of execution conditions, and storing a data package for download includes storing the multimedia files transmitted from a multimedia file provider server by predetermined classified item;
 downloading the data package to the mobile terminal through a communication network and storing the data package in the memory part of the mobile terminal;
 loading, in the mobile terminal, a data package to set the execution conditions;
 selecting at least one of the multimedia files according to one of the set execution conditions; and
 executing, in the mobile terminal receiving the data package responsive to one of the execution conditions being satisfied by user input, the multimedia file or files according to the satisfied execution condition.

21. The method as claimed in claim 20, wherein each multimedia file includes at least two data among video data, audio data or text data.

22. The method as claimed in claim 21, wherein the data package is stored as a compressed file to reduce a transmission capacity in the communication network.

23. The method as claimed in claim 21, wherein the data package is stored as a merged file to reduce a time to generate the data package in a package generating server.

24. The method as claimed in claim 20, wherein the one of the execution conditions is satisfied by inputting to the mobile terminal one of the following signals:
 a starting key for supplying power with the mobile terminal, a call receiving key signal for connecting a call when a call is requested to the mobile terminal, a call sending key signal when requesting a call by using the mobile terminal, an ending key signal for ending the mobile terminal, or an internet connecting key signal when connecting the wireless communication network by using the mobile terminal.

25. The method as claimed in claim 20, wherein the one of the execution conditions is satisfied by number key signals or special key signals being inputted.

26. An apparatus for providing multimedia services in a mobile terminal comprising:
- a package data generating part for generating package data including execution conditions each execution condition for executing associated one or ones of a plurality of multimedia files in the mobile terminal: and
- a package data managing part for storing the package data generated from the package data generating part, for downloading the package data to the mobile terminal according to a predetermined condition and for selecting responsive to user input the associated one or ones of the plurality of multimedia files for execution, the associated one or ones of the multimedia files being selected using the execution condition associated therewith, wherein the package data generating part comprises:
- a database managing module for storing the multimedia files transmitted from a multimedia file provider server by predetermined classified item; and
- a package data generating module for generating the package data by combining one execution condition with at least one multimedia file and by combining each of the multimedia files stored correspondingly to a plurality of execution conditions with the plurality of execution conditions.

27. The apparatus as claimed in claim 26, wherein the package data managing part comprises:
- a user information managing module for managing a plurality of mobile terminals provided with the multimedia services;
- a storing module for storing the package data generated from the package data generating part; and
- a transmitting module for transmitting the package data to the mobile terminal if the mobile terminal requests the package data to be downloaded or if the latest downloading information passes a certain time when searching the downloading information.

* * * * *